United States Patent [19]

Dullea et al.

[11] Patent Number: 4,530,710

[45] Date of Patent: Jul. 23, 1985

[54] LOW-PRESSURE ARC DISCHARGE LAMP HAVING PARALLEL DISCHARGE TUBES WITH AN ARC-CONTAINING INTERCONNECTING CHANNEL; AND METHOD OF MANUFACTURING SAME

[75] Inventors: Leonard V. Dullea, Peabody; Frederick A. Loughridge, Ipswich; Stephen G. Johnson, Georgetown, all of Mass.

[73] Assignee: GTE Products Corporation, Stamford, Conn.

[21] Appl. No.: 544,669

[22] Filed: Oct. 24, 1983

[51] Int. Cl.³ .......................... C03D 33/06; H01J 9/00
[52] U.S. Cl. ............................ 65/56; 65/54; 65/55; 313/493; 313/634; 445/26
[58] Field of Search .................. 445/26; 313/493, 634; 65/36, 54, 55, 56

[56] References Cited

U.S. PATENT DOCUMENTS

| | | | |
|---|---|---|---|
| 2,000,560 | 5/1935 | Eitel et al. | 65/56 X |
| 2,683,333 | 7/1954 | Canicoba | 65/55 |
| 2,822,646 | 2/1958 | Krefft | 65/55 X |
| 3,114,619 | 12/1963 | Nitsche et al. | 65/56 X |
| 3,212,870 | 10/1965 | Condon | 65/56 X |
| 3,501,662 | 3/1970 | Plagge | 445/26 X |
| 4,324,447 | 4/1982 | van der Wolf et al. | 445/26 |
| 4,481,442 | 11/1984 | Albrecht et al. | 445/26 X |

*Primary Examiner*—Robert Lindsay
*Attorney, Agent, or Firm*—Joseph S. Romanow

[57] ABSTRACT

A method of manufacturing a low-pressure arc discharge lamp formed by interconnecting two or more parallel glass discharge tubes, each tube being sealed at one end. A hermetically sealed arc-containing channel between the two adjacent tubes is formed by heating opposing sections of the two tubes to soften a first and second site on each of the respective tubes. Then, one of the tubes is pressurized until a glass bubble forms from the softened site; the bubble is blown toward and onto the other tube about the softened site thereof. The pressure in the first tube is then released, and pressure is applied in the second tube to form a second glass bubble which fuses with the first glass bubble and bursts into the first tube thereby forming the sealed arc-containing channel between the two tubes. The technique may be applied to multiple tube assemblies by alternating the end of the tube at which the joint is formed. Once the tubes are joined, they may be processed by current manufacturing techniques to produce a low-pressure arc discharge lamp.

9 Claims, 5 Drawing Figures

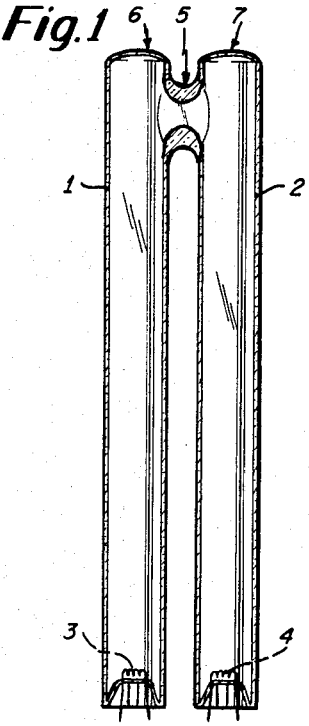
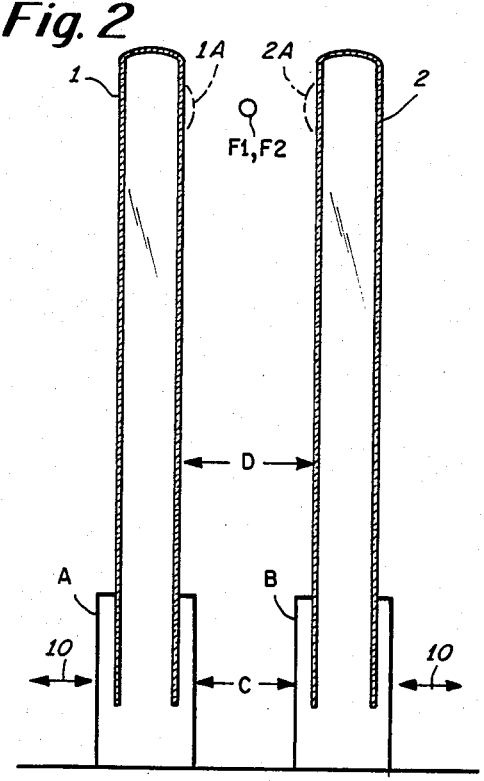
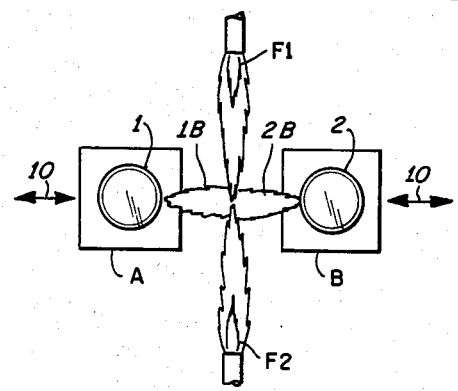
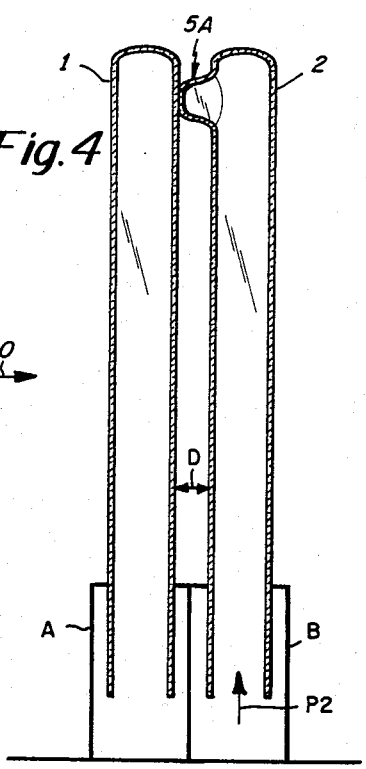

LOW-PRESSURE ARC DISCHARGE LAMP HAVING PARALLEL DISCHARGE TUBES WITH AN ARC-CONTAINING INTERCONNECTING CHANNEL; AND METHOD OF MANUFACTURING SAME

TECHNICAL FIELD

This invention relates to low-pressure arc discharge lamps and more particularly to such lamps having two or more parallel discharge tubes with an arc-containing interconnecting channel, and methods for producing same.

BACKGROUND ART

Methods of manufacturing low-pressure mercury vapor discharge lamps are described, for example, in U.S. Pat. Nos. 3,501,662 and 4,324,447. The techniques described in these patents and in other prior art constructions represent relatively high-cost methods of producing these lamps. The method described in U.S. Pat. No. 3,501,662 requires that apertures be formed in the sidewalls of the discharge tubes followed by joining such tubes with a fused solder glass seal. This multi-step method does not readily adapt itself to automation. The method described in U.S. Pat. No. 4,324,447 requires the formation of separately blown collars on each discharge tube which are subsequently fused. This also is a multi-step method which can be practiced only with tubes having sufficient wall thickness so as to enable formation of the collars and subsequent fusing thereof.

DISCLOSURE OF THE INVENTION

It is an object of the invention to provide a reliable and economical method of manufacture of a low-pressure arc discharge lamp wherein two or more parallel glass discharge tubes have an arc-containing channel between adjacent discharge tubes.

Another object of the invention is to provide a method of manufacture of a low-pressure arc discharge lamp which may be practiced substantially without restriction on the length dimension of the lamp.

A further object of the invention is to provide a method of manufacture of a low-pressure arc discharge lamp in which the thickness of the wall of the glass tubing forming the lamp may be considerably less than used in existing methods of manufacture.

Still another object of the invention is to provide a method of manufacture of a low-pressure arc discharge lamp by joining two or more parallel glass discharge tubes where such method is readily adapted to automation and is carried out in relatively few steps.

These objects are accomplished, in one aspect of the invention, by the provision of a method of manufacturing a low-pressure arc discharge lamp, and the lamp produced by such method, where such lamp has at least two substantially parallel glass discharge tubes where each tube is closed at one end and connected to an adjacent tube by an arc-containing channel extending traversely to the walls of the discharge tubes. Such method comprises the steps of: positioning the tubes substantially in parallel with a predetermined spacing therebetween; applying heat means at a preselected location on the wall of each tube so as to provide a first softened site on the first tube facing a second softened site on the second tube; blowing the first softened site outwardly from the inside of the first tube to form a first bubble that bursts on the second softened site; and thereafter blowing the second softened site outwardly from the inside of the second tube to form a second gas bubble which fuses with the first glass bubble and bursts into the first tube, thus forming the arc-containing channel between the tubes.

BRIEF DESCRIPTION OF THE DRAWINGS

FIG. 1 is an elevational view of one embodiment of a low-pressure arc discharge lamp produced in accordance with the method of the present invention;

FIG. 2 is an elevational view showing a step in the method in which the parallel discharge tubes are being brought into a position having a predetermined spacing therebetween;

FIG. 3 is a top view of the apparatus of FIG. 2 used in practicing the method of this invention;

FIG. 4 is an elevational view similar to the view of FIG. 2 showing another step in the method of the invention illustrating the blowing of the glass bubble from one glass discharge tube to the other.

BEST MODE FOR CARRYING OUT THE INVENTION

Figure 5:
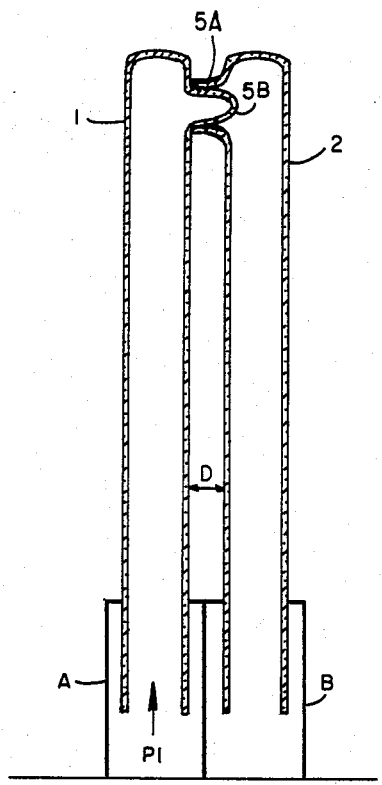
FIG. 5 is an elevational view similar to the view of FIG. 2 showing still another step in the method of the invention illustrating the blowing of the second glass bubble within the burst first glass bubble.

For a better understanding of the present invention, together with other and further objects, advantages and capabilities thereof, reference is made to the following disclosure and appended claims taken in conjunction with the above-described drawings.

FIG. 1 shows one embodiment of an arc discharge lamp. The lamp comprises two parallel discharge tubes 1 and 2 having at the lower ends thereof respective electrodes 3 and 4. The tops of the discharge tubes are sealed at the ends remote from the electrodes as indicated by respective closed ends 6 and 7. The discharge spaces of both tubes are interconnected close to ends 6 and 7 by means of arc-containing channel 5. Tubes 1 and 2 may be coated with a luminescent layer either prior to the formation of arc-containing channel 5 or after its formation.

FIGS. 2-4 describe different steps in a method of construction of a low-pressure arc discharge lamp, e.g., the lamp of FIG. 1, showing, in particular, steps for the formation of arc-containing channel 5.

Two discharge tubes, such as tubes 1 and 2, which are to be joined may be placed in positioning blocks A and B, respectively, as illustrated in FIG. 2. These positioning blocks, which may be controlled by automation, are described herein schematically simply as holders for supporting tubes 1 and 2 in upright and substantially parallel positions. Blocks A and B are adapted for translational motion in the direction of arrows 10 shown in FIGS. 2 and 3 so that distance D between tubes 1 and 2 may be adjusted to a preselected value.

FIGS. 2 and 3 show the discharge tubes and associated positioning blocks in an initial step of the method described herein with a relatively substantial spacing D between the tubes. The spacing between the positioning blocks is represented by the dimension C in FIG. 2. In FIG. 2, blocks A and B are spaced apart from one another. In further steps of the method described herein, blocks A and B are moved toward each other.

In this embodiment of the invention, the heat means comprises opposed flames F1 and F2. When movement of blocks A and B commences, or just prior thereto, flames F1 and F2 may be ignited, as shown in FIG. 3. F1 and F2 are maintained until blocks A and B touch each other, as shown in FIG. 4, i.e., distance C is reduced to zero. As tubes 1 and 2 are moved toward each other, the glass walls at sites 1A and 2A are softened by the flame splashes emanating from opposing flames disposed on either side of tubes 1 and 2. The flames and flame splashes may be provided by two opposed burners, as shown in FIG. 3. The illustration shows the placement of the burners and the resulting flame splashes occurring at 1B and 2B.

Tubes 1 and 2 preferably are moved toward each other with the flames being stationary. The speed with which the tubes are moved (reducing dimension C) is determined by the duration and intensity of the flame heat; such speed may be adjusted so that the glass walls of sites 1A and 2A have softened at the time blocks A and B touch. When blocks A and B touch, glass sites 1A and 1B should be at the desired degree of softness.

When blocks A and B touch, tubes 1 and 2 have reached the preselected separation distance for the next step. Now, a low-pressure gas is introduced into tube 2. This is shown in FIG. 4 by pressure arrow P2. The entry of low-pressure gas causes a glass bubble to form outwardly from tube 2 at site 2A toward tube 1. The bubble is allowed to burst on tube 1. Then, the pressure in tube 2 is released. Next, a low-pressure gas is introduced into tube 1. The sequence of events described herein is important, but minor overlapping of steps may be permissible.

FIG. 4 shows the step in which blocks A and B have been brought together so as to provide the preselected dimension D and with a low-pressure gas having been introduced into tube 2 to provide the bubble 5A that is blown outwardly from tube 2 at site 2A to burst on tube 1. The bubble bursts about the softened site 1A of tube 1.

FIG. 5 shows the step in which gas pressure P2 has been released from tube 2 and gas pressure P1 introduced into tube 1, this causes a second glass bubble 5B to form outwardly from tube 1 at site 1A which essentially enters and expands within the burst first bubble 5A previously blown outwardly from tube 2. The bubble from tube 1 bursts into the previous bubble and fuses therewith in order to form arc-containing channel 5 between tubes 1 and 2, as shown in FIG. 1. The pressure in tube 1 is then released.

Flames F1 and F2 are extinguished during the formation of the two bubbles so that there is no interference between the bubbles and the flames. The bubble blowing may be synchronized so that it occurs immediately after extinguishing the flames.

The preselected spacing between the two discharge tubes and the selective blowing of the respective softened sites of each tube provide an arc-containing channel 5 which joins the discharge tubes with a hermetically sealed interconnecting channel. The tubes, so connected and sealed, may be further processed into a low-pressure arc discharge lamp by standard techniques.

The thickness of the wall of the glass tube may be considerably less than used in other prior art methods, such as in the method described in U.S. Pat. No. 4,324,447. This is possible because of the fusing of the two bubbles which provides an interconnecting channel having a greater thickness than is obtained, for example, in U.S. Pat. No. 4,324,447, wherein the blown collars are separately joined. In the fused channel described herein, there is essentially a doubling of the thickness of the channel wall by virtue of blowing one bubble inside of the other.

Standard wall tubing, having a wall thickness of, for example, 0.8 mm, produces a seal which is quite adequate. Standard T-5 tubes, having a wall thickness of 0.95 mm, may also be employed. These examples are cited, for example, in comparison with the tube wall thickness preferred in U.S. Pat. No. 4,324,447, having a wall thickness of 1.35 mm.

For multiple tube connections, the technique of the present invention of joining the tubes is the same except that the glass channel may occur at alternate ends of the tube to provide maximum discharge length. In this regard, refer to U.S. Pat. No. 3,501,662, which discloses alternate end channels.

There is described herein a reliable and economical method for constructing a low-pressure arc discharge lamp in which there are virtually no restrictions in the length dimension of the lamp. The present invention may be practiced with tubes of widely varying diameters. The wall thickness of the glass tubing used in constructing the lamp may be considerably less than described in prior art methods.

While there have been shown what are at present considered to be preferred embodiments of the invention, it will be apparent to those skilled in the art that various changes and modifications can be made herein without departing from the scope of the invention as defined by the appended claims.

We claim:

1. A method of manufacturing a low-pressure arc discharge lamp having at least two substantially parallel glass discharge tubes where each tube is closed at one end and connected to an adjacent tube by a hermetically sealed arc-containing channel extending transversely to the walls of said discharge tubes, said method comprising the steps of:
    (a) positioning said tubes substantially in parallel with a predetermined spacing therebetween;
    (b) applying heat means at a preselected location on the wall of each tube so as to provide a first softened site on said first tube facing a second softened site on said second tube;
    (c) blowing said first softened site outwardly from the inside of said first tube to form a first glass bubble that bursts on said second softened site; and
    (d) thereafter blowing said second softened site outwardly from the inside of said second tube to form a second glass bubble which fuses with said first glass bubble and bursts into said first tube, thus forming said hermetically sealed arc-containing channel between said tubes.

2. A method as set forth in claim 1 wherein said tubes are positioned in parallel by providing positioning blocks on which said tubes are mounted and moving said positioning blocks toward one another until said preselected spacing is attained.

3. A method as set forth in claim 2 wherein said positioning blocks are moved toward one another until they contact so as to provide said preselected spacing.

4. A method as set forth in claim 1 wherein the blowing in the said tube is attained by introducing a low-pressure gas into the said first tube.

5. A method as set forth in claim 4 wherein the blowing in said second tube is attained by introducing a low-pressure gas into said second tube.

6. A method as set forth in claim 5 wherein said low-pressure gas in said first tube is released before said introduction of said low-pressure gas into said second tube.

7. A method as set forth in claim 6 wherein said heat means comprises two opposed flames, each flame being directed into the other flame, such that the flame splashes resulting therefrom simultaneously produce said first and second softened sites.

8. A method as set forth in claim 7 wherein the cross-sectional area of said arc-containing channel is approximately equal to the cross-sectional area of each of said discharge tubes.

9. A low pressure arc discharge lamp comprising two or more substantially parallel glass discharge tubes, where each tube is closed at one end and the discharge spaces of two adjacent discharge tubes are interconnected by an hermetically sealed arc-containing channel extending transversely to the walls of said tubes such that during operation of the lamp the discharge extends through the major portion of said first tube, continues through said arc-containing channel, and further extends through the major portion of said second tube, said lamp being produced by a method comprising:
 (a) positioning said tubes substantially in parallel with a preselected spacing therebetween;
 (b) applying heat means at a preselected location on the wall of each tube so as to provide a first softened site on said first tube facing a second softened site on said second tube;
 (c) blowing said first softened site outwardly from the inside of said first tube to form a first glass bubble that bursts on said second softened site; and
 (d) thereafter blowing said second softened site outwardly from the inside of said second tube to form a second glass bubble which fuses with said first glass bubble and bursts into said first tube, thus forming said hermetically sealed arc-containing channel between said tubes.

* * * * *